(12) United States Patent
Bharadwaj (10) Patent No.: US 10,482,519 B1
(45) Date of Patent: Nov. 19, 2019

(54) RELATIONSHIP-BASED SEARCH AND RECOMMENDATIONS VIA AUTHENTICATED NEGATIVES

(71) Applicant: NETFLIX, INC., Los Gatos, CA (US)

(72) Inventor: Vijay Bharadwaj, Belmont, CA (US)

(73) Assignee: NETFLIX, INC., Los Gatos, CA (US)

( * ) Notice: Subject to any disclaimer, the term of this patent is extended or adjusted under 35 U.S.C. 154(b) by 833 days.

(21) Appl. No.: 14/546,859

(22) Filed: Nov. 18, 2014

(51) Int. Cl.
*G06Q 30/06* (2012.01)
*H04L 29/06* (2006.01)
*G06F 16/9535* (2019.01)

(52) U.S. Cl.
CPC ..... *G06Q 30/0631* (2013.01); *G06F 16/9535* (2019.01); *H04L 63/08* (2013.01)

(58) Field of Classification Search
None
See application file for complete search history.

(56) References Cited

U.S. PATENT DOCUMENTS

| | | | | |
|---|---|---|---|---|
| 8,032,526 B2 * | 10/2011 | Fukazawa | ......... | G06F 17/30867 707/722 |
| 8,577,896 B2 * | 11/2013 | Sanders | ............ | G06F 17/30867 707/748 |
| 8,789,106 B2 * | 7/2014 | Furusawa | ......... | G06F 17/30867 725/46 |
| 9,959,563 B1 * | 5/2018 | Wu | ..................... | G06Q 30/0631 |
| 2006/0248091 A1 * | 11/2006 | Yamamoto | ........... | H04N 21/235 |
| 2007/0094259 A1 * | 4/2007 | Shi | .......................... | G06Q 30/02 |
| 2010/0041482 A1 * | 2/2010 | Kumar | ................... | G06Q 30/02 463/42 |

OTHER PUBLICATIONS

De Gemmis, Marco, et al. "Integrating tags in a semantic content-based recommender." Proceedings of the 2008 ACM conference on Recommender systems. ACM, 2008. (Year: 2008).*

* cited by examiner

*Primary Examiner* — Resha Desai
*Assistant Examiner* — Michelle T Kringen
(74) *Attorney, Agent, or Firm* — Artegis Law Group, LLP (57) ABSTRACT

One embodiment of the present invention sets forth techniques for generating recommendation sets for a first client device. A recommendation system receives, from the first client device, a first selection of a first recommended item included in a plurality of recommended items. The recommendation system identifies a second recommended item included in the plurality of recommended items that has not been selected. The recommendation system retrieves an authenticated negative item from a plurality of authenticated negative items. The recommendation system stores one or more entries in a log file comprising a plurality of entries, based on at least one of the first recommended item, the second recommended item, and the authenticated negative item. One advantage of the disclosed techniques is that the use of authenticated negative examples, also referred to herein as authenticated negative items, provides a more relevant set of recommendations for the user.

14 Claims, 7 Drawing Sheets

| USER ID 510 | TITLE ID 520 | SELECTED? 530 | GENRE 540 | POPULARITY 550 | ... |
|---|---|---|---|---|---|
| 123 | 15437 | Yes | Horror | 9.1 | ... |
| 123 | 54827 | No | Documentary | 8.4 | ... |
| 123 | 45826 | No | Suspense | 5.4 | ... |
| 123 | 74589 | No | Family | 9.3 | ... |
| 123 | 72948 | No | Drama | 4.5 | ... |
| 123 | 42846 | No | Suspense | 7.9 | ... |
| 123 | 35415 | No | Documentary | 6.6 | ... |
| 123 | 25819 | No | Family | 8.9 | ... |
| 123 | 18430 | No | Horror | 0.2 | ... |
| 123 | 94817 | No | Drama | 0.1 | ... |

LOGGING DATABASE (240)

Row labels: 505(0) through 505(9)

RELATIONSHIP-BASED SEARCH AND RECOMMENDATIONS VIA AUTHENTICATED NEGATIVES

BACKGROUND OF THE INVENTION

Field of the Invention

The present invention generally relates to computer software and, more particularly, to improved relationship-based search and recommendations via authenticated negatives.

Description of the Related Art

Numerous websites offer items, such as various goods and services, available for online selection or purchase by a user of the website. Such websites may present recommendations for consideration by the user. The recommendations may be based on a reinforcement learning model, whereby a processor executing a software agent makes recommendations based on past history, such as items previously selected or purchased by the user. In typical implementations, the software agent collects data related to which goods and services previously selected by the user and which goods and services previously recommended to the user were not selected by the user. The collected data from these past recommendations and selections informs decisions about what goods and services should be subsequently recommended to the user. For example, items that are related to the items previously selected by the user could be recommended to the user for consideration. Likewise, items that are related to the items not selected by the user could be avoided for future recommendations. The goal of this approach is to recommend relevant items that have a higher likelihood of being selected by the user. The user's experience is thereby improved, because the user views items that are relevant and interesting to that particular user. As a result, the user is more likely to remain on the website for longer periods of time, selecting and purchasing more goods and services.

One potential drawback with the above approach is that non-selection of an item does not necessarily indicate that the user completely disfavors the non-selected item. For example, a user may choose to not select a particular item based on reviews or recommendations by others, the user's current mood, or relative popularity of the recommended items. For example, non-selection of a particular item could indicate a temporal condition associated with a particular instant in time. In other words, the user could desire to choose to watch a non-selected item at a later point in time, even though the user currently chooses not to select the particular item.

One possible solution to this drawback is to purposely include some items that are known to be unpopular in the set of recommendations. Such an approach improves the reinforcement learning model's ability to distinguish between items not selected due to lack of popularity, quality, or relevance versus items not selected for other reasons. However, this possible solution results in the user receiving recommendations that are known to be unrelated to the user's previous history and are likely to be undesirable to the user. As a result, the user's online experience with the website is diminished, thereby increasing the likelihood that the user visits alternate websites that present more desirable recommendations for selection and purchase of goods and services.

As the foregoing illustrates, what is needed in the art is an improved approach for determining what items should be recommended to a user of a website.

SUMMARY OF THE INVENTION

One embodiment of the present invention sets forth a method for generating recommendation sets for a first client device. The method includes receiving, from the first client device, a first selection of a first recommended item included in a plurality of recommended items. The method further includes identifying a second recommended item included in the plurality of recommended items that has not been selected. The method further includes retrieving an authenticated negative item from a plurality of authenticated negative items. Finally, the method further includes storing one or more entries in a log file comprising a plurality of entries, based on at least one of the first recommended item, the second recommended item, and the authenticated negative item.

Other embodiments include, without limitation, a computer-readable storage medium that includes instructions that enable a processing unit to implement one or more aspects of the present invention and a computing device configured to implement one or more aspects of the present invention.

One advantage of the disclosed techniques is that the use of authenticated negative examples, also referred to herein as authenticated negative items, provides a more relevant set of recommendations for the user. As a result, the user enjoys a richer and more meaningful experience.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

Figure 1:
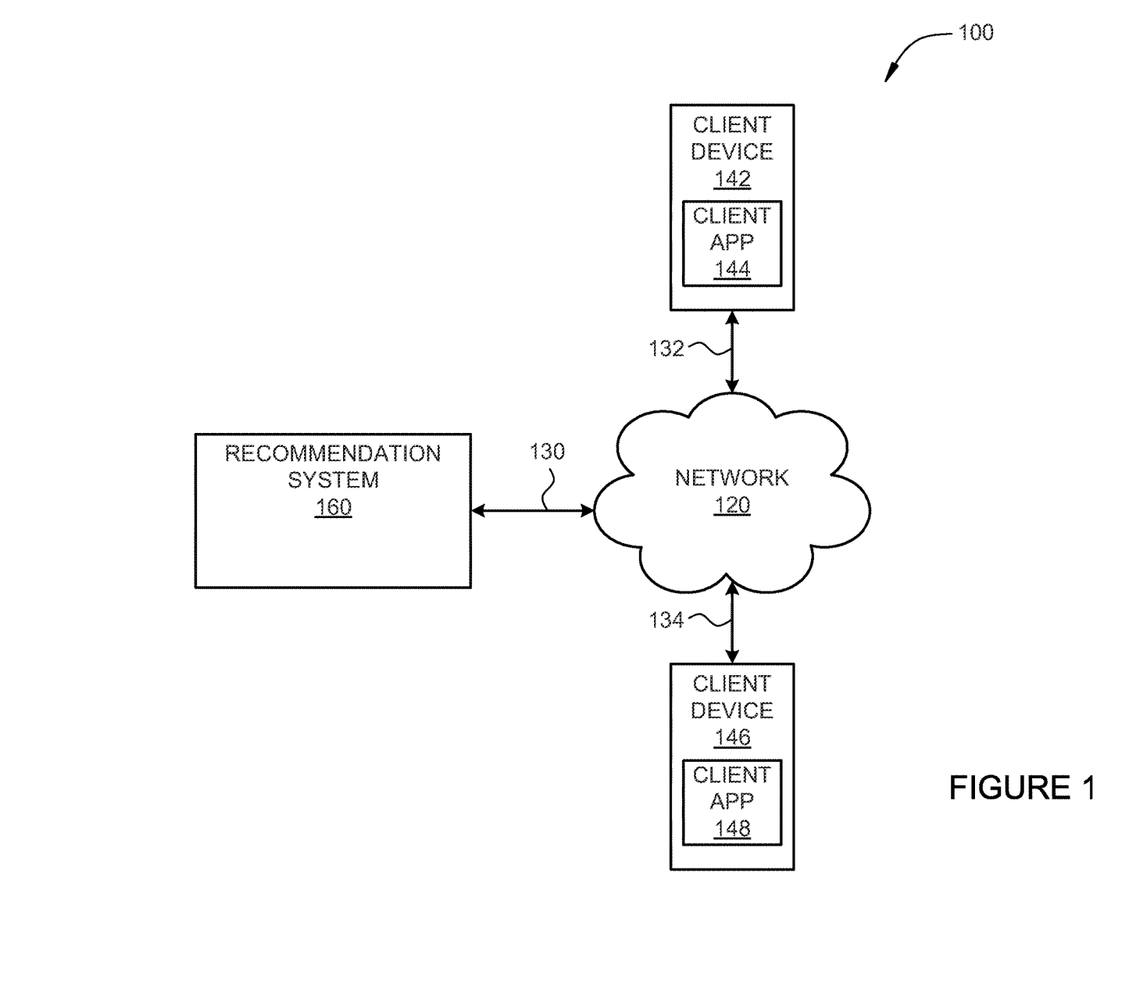
FIG. 1 illustrates a networked computing system configured to implement one or more aspects of the present invention.

FIG. 1 illustrates a networked computing system 100 configured to implement one or more aspects of the present invention. As shown, the networked computer system 100 includes, without limitation, client devices 142 and 146 connected to a recommendation system 160 via a network 120. The network 120 may be any suitable environment to enable communications among remotely located computer systems, including, without limitation, a LAN (Local Area Network) and a WAN (Wide Area Network).

The client device 142 is configured to execute a client application (client app) 144, which is, in turn, configured to receive recommendation sets from the recommendation system 160 and transmit selections of items, such as goods and services, to the recommendation system 160. As further described below, the client device may display the recommendation sets to a user in the form of a webpage via a browser application. The client device 142 communicates with the recommendation system 160 over the network 120 via communications link 132.

Likewise, the client device 146 is configured to execute a client application (client app) 148, which is, in turn, configured to receive recommendation sets from the recommendation system 160 and transmit selections of items, such as goods and services, to the recommendation system 160. As further described below, the client device may display the recommendation sets to a user in the form of a webpage via a browser application. The client device 146 communicates with the recommendation system 160 over the network 120 via communications link 134.

The recommendation system 160 transmits recommendation sets to a plurality of client devices, such as client devices 142 and 146, where each recommendation set includes various items, such as goods or services, for consideration by a user associated with the corresponding client device 142 or 146. In various embodiments, the items may include, without limitation, goods available for purchase and shipment, services available at an offsite location, in-home services, auction services for various goods and services, and streaming services, such as media titles that a user may select for streaming to the client device 142 or 146.

As described in greater detail below in conjunction with FIGS. 2-7, when the recommendation system 160 receives a selection of an item from a client device 142 or 146, the recommendation system 160 stores a data entry corresponding to the selected item in a logging database. The recommendation system 160 utilizes the selection of an item to increase the likelihood of recommending items that are similar to the selected item. The recommendation system 160 also stores one or more data entries corresponding to the items not selected in the logging database. The recommendation system 160 utilizes the non-selection of an item to decrease the likelihood of recommending items that are similar to the non-selected item. The recommendation system 160 also generates additional data entries, based on a list of authenticated negative examples, and stores the additional generated data entries into the logging database as well. Typically, authenticated negative examples include items that are generally disfavored by a large percentage of users. These additional generated data entries, based on authenticated negative examples, have the same or similar effect as non-selected items. That is, the recommendation system 160 utilizes the additional generated data entries to decrease the likelihood of recommending items that are similar to the items associated with the additional generated data entries.

The recommendation system 160 then generates recommendation sets for transmission to client devices 142 or 146, where the recommendation sets are based on the data entries in the logging database, including data entries associated with selected items, data entries associated with non-selected items, and the additional generated data entries. Advantageously, the accuracy and relevance of the resulting recommendations is improved, in that the data entries based on authenticated negative examples decrease the likelihood of recommending items that are generally disfavored.

Figure 2:
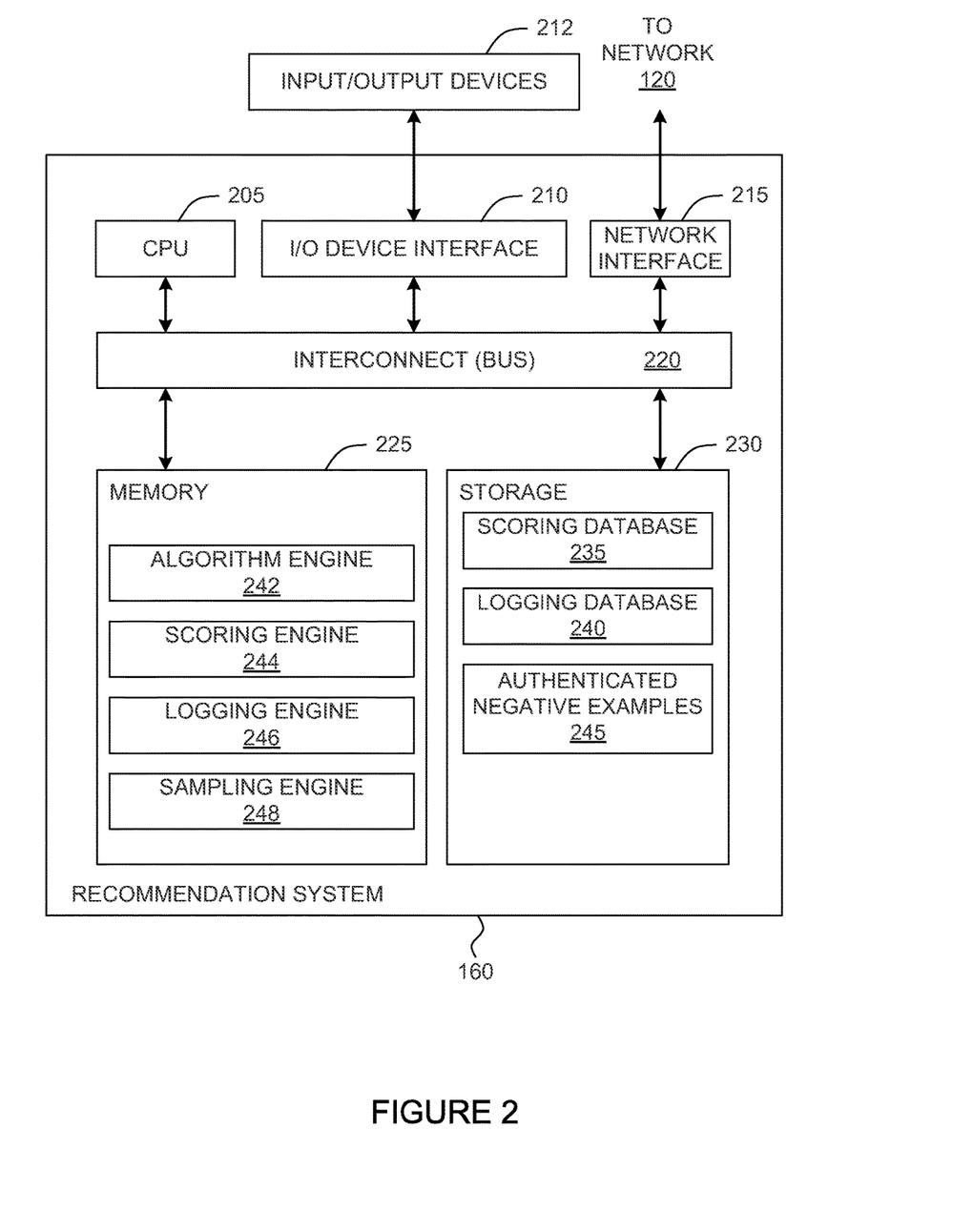
FIG. 2 illustrates the recommendation system of FIG. 1, according to one embodiment of the invention.

FIG. 2 illustrates the recommendation system 160 of FIG. 1, according to one embodiment of the invention. As shown, the recommendation system 160 includes, without limitation, a central processing unit (CPU) 205, a network interface 215, an interconnect (bus) 220, a memory 225, and storage 230. The recommendation system 160 may also include an input/output (I/O) device interface 210 connecting user input/output devices 212 (e.g., keyboard, display and mouse devices) to the recommendation system 160.

In some embodiments, the recommendation system 160 may include one or more nodes, where each node may be a physical computing machine that connects to the network 120. Client devices, such as client devices 162 and 164, may connect to one or more nodes of the recommendation system 160 via network 120. The quantity of nodes participating in the recommendation system 160 may increase or decrease dynamically depending on changes in the computational demands placed on the recommendation system 160 by the various client devices connected to the recommendation system 160.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, input/output device interface 210, storage 230, network interface 215, and memory 225. In various embodiments, the CPU 205 may include, without limitation, a single CPU, multiple CPUs, and a single CPU having multiple processing cores. In various embodiments, the memory 225 may include, without limitation, dynamic random access memory (DRAM), static random access memory (SRAM), and content addressable memory (CAM). The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN).

Illustratively, the memory 225 includes an algorithm engine 242, a scoring engine 244, a logging engine 246, and a sampling engine 248, and the storage 230 includes a scoring database 235, a logging database 240, and authenticated negative examples 245. As further described herein, the algorithm engine 242 generates scoring equations used by the scoring engine 244 to generate a scoring database 235, where the scoring database 235 includes scores for each user/media title combination. The scores collected in the scoring database 235 determine which items to include in each recommendation set transmitted to a client device. Data regarding which items are selected and not selected by the client device are transmitted to the logging engine 246. The logging engine 246 transmits the collected data to the sampling engine 248, which in turn selects at least a portion of the data received by the logging engine 246. The sampling engine 248 supplements this data with additional data entries based on the authenticated negative examples 245. In some embodiments, the sampling engine 248 may set or change the relative influence of non-selected items received from the logging engine 246 versus the items retrieved from the authenticated negative examples 245. Setting or changing the relative influence of non-selected items versus the items retrieved from the authenticated negative examples 245, in turn, influences the media titles that are selected for the resulting recommendation set. The sampling engine 248 then updates the logging database 240 with data entries, including data entries associated with selected items, data entries associated with non-selected items, and data entries associated with the authenticated negative examples 245. The data entries in the updated logging database 240 are periodically retrieved by the algorithm engine 242 to generate new scoring equations. Because the data entries in the updated logging database 240 include data entries based on the authenticated negative examples 245, the scoring equations generated from the updated logging database 240 decrease the likelihood that generally disfavored items, as indicated by the authenticated negative examples 245, are recommended to users.

Figure 3:
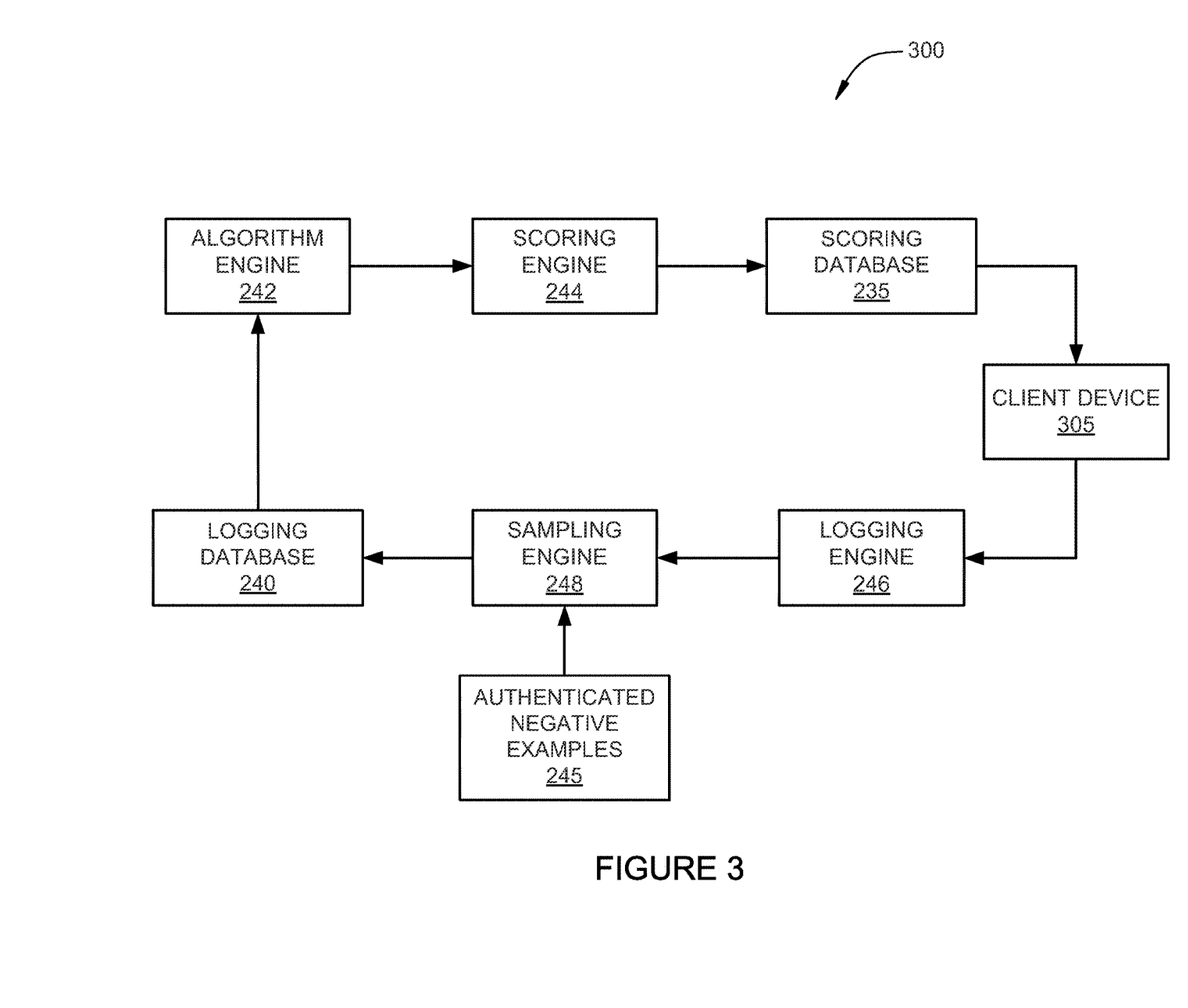
FIG. 3 illustrates a data flow associated with the recommendation system of FIG. 1, according to one embodiment of the present invention.

FIG. 3 illustrates a data flow 300 associated with the recommendation system 160 of FIG. 1, according to one embodiment of the present invention. As shown, the data flow includes, without limitation, an algorithm engine 242, a scoring engine 244, a logging engine 246, a sampling engine 248, a scoring database 235, a logging database 240, and authenticated negative examples 245, and a client device 305. In operation, these system elements function substantially the same as described in FIGS. 1-2, except as further described below.

The algorithm engine 242 retrieves entries from the logging database 240 and generates scoring equations that characterize historical viewing behavior of each user associated with the recommendation system 160. In one embodiment, the equations generated by the algorithm engine 242 are based on popularity, genre, and viewing time associated with a service for streaming media titles, such as movies, serial drama, and documentaries. The algorithm engine 242 periodically generates new equations as additional data is stored into the logging database 240. For example, the algorithm engine 242 could generate new scoring equations on a weekly basis, where the new equations are used to generate recommendation sets for each user until the next execution of the algorithm engine 242. The scoring equations generated by the algorithm engine 242 are transmitted to the scoring engine. In one example, the scoring equations generated by the algorithm engine 242 are of the form illustrated in Equation 1 below:

$$\text{Score}_{u,m} = P_m + \sum_{g=1}^{n} I_g(W_{ug} + W_{hug}R_{ug}) \quad (1)$$

where $\text{Score}_{u,m}$ is the score for a particular user/media title combination, $P_m$ is the popularity of the media title, g is the genre of the movie title, $I_g$ is an index that is equal to 1 if genre of the media title is equal to the index g and 0 otherwise, $W_{ug}$ is the weighting factor for a given user/genre combination, $W_{hug}$ is the weighting factor for a given user/genre combination based on the percentage of hours the user views the particular genre, and $R_{ug}$ is the ratio hours viewed for the given genre versus total hours viewed by the user. Equation 1 is intended to be exemplary only, and not restrictive in scope. In various embodiments, other or different factors may be used to generate scoring equations, including, without limitation, user ratings, director name, lead actor name(s), year of release, and language.

The scoring engine 244 applies the scoring equations to each user/media title combination. In one example, a particular media title in the horror genre could have a popularity $P_m$ of 7.5 on a scale of 1 to 10. The weight factor $W_{ug}$ for the horror genre for a given user could be 0.9 and the hours viewed weight factor $W_{hug}$ for the horror genre for the given user could be 5.6. Finally, the user could spend 50% of the total viewing hours watching media titles in the horror genre ($R_{ug}$=0.5). Applying Equation 1 to this particular example would result in a score $\text{Score}_{u,m}$ of 7.5+(0.9+(5.6*0.5))=11.2 for this particular user/media title combination. The scoring engine 244 stores calculated scores for each user/media title combination in the scoring database 235.

The scoring database 235 stores scores calculated by the scoring engine 244 for each user/media title combination. The scores in the scoring database 235 determine which media titles are included in a recommendation set sent to a client device 305. Other factors may also influence whether a given media title is selected for a particular recommendation set, including, without limitation, the last time the media title was included in a recommendation set for the user, the similarity of the media title to other titles in the recommendation set, or the overall popularity of the movie.

The client device 305 receives recommendation sets based, at least in part, on the values in the scoring database 235, and presents the recommendation sets to a user associated with the client device 305. A recommendation set is typically presented to the user in a graphical user interface, such as a web browser interface. A user may select one of the media titles in the recommendation set. Alternatively, if none of the media titles in the recommendation set are desirable, the user may choose to receive a different set of recommendations. The client device transmits data regarding selected and non-selected media titles to the logging engine 246. Alternatively, the logging engine 246 derives data regarding non-selected media titles based those media titles that have been presented to the user, but that that the user did not select.

The logging engine 246 receives data regarding selected items and non-selected items from a plurality of client devices, such as client device 305. The logging engine 246 identifies each selected and non-selected item with a user associated with the corresponding client device. For example, a selected or non-selected item may be tagged with a user identifier associated with a login account associated with the client device 305. The logging engine 246 transmits the received data to the sampling engine 248.

The sampling engine 248 receives data from the logging engine 246 regarding selected and non-selected items, and formats data entries for storing in the logging database 240. As further described herein, the formatted data entries may include a user identifier, a media title identifier, and various information associated with the media title, including, without limitation, popularity, genre, rating, and whether the media title was selected by the user or not. The sampling engine 248 may format a data entry for every selected and non-selected item, as received from the logging engine 246. Alternatively, the sampling engine 248 may select a subset of the selected and non-selected items received from the logging engine 246 via any technically feasible sampling technique.

The sampling engine 248 also selects a portion of entries from the authenticated negative examples 245, and formats the selected entries for the logging database 240. In one example, the sampling engine 248 could receive a selected item and a set of non-selected items from the logging engine 246 based on a recommendation set presented to a particular user. The sampling engine 248 could format data entries for the selected item and a portion of the non-selected items for storing in the logging database 240. The sampling engine 248 could also select one or more items from the authenticated negative examples 245. The sampling engine 248 would format the items selected from the authenticated negative examples 245 to appear as if these items were in the set of non-selected items from the user. In other words, the sampling engine 248 would tag the items selected from the authenticated negative examples 245 with a corresponding user identifier, and mark the items as not selected. The sampling engine 248 stores data entries related to selected items, non-selected items, and authenticated negative examples 245 in the logging database 240.

The authenticated negative examples 245 are media titles that are known to be rarely, if ever, desired by users. Media titles may be selected for the authenticated negative examples 245 based on any one or more parameters, including, without limitation, number of times the media title was selected, quantity of hours the media title was viewed, and ratings of the media title by users. The set of media titles may be determined as a fixed quantity, such as the bottom fifty media titles in terms of hours viewed, or by a threshold value, such as media titles with a rating below 0.2 on a scale of 0 to 5.

The logging database 240 includes data entries formatted by the sampling engine 248 resulting from items selected by users, items not selected by users, and the authenticated negative examples 245. The data entries in the logging database 240, in turn, are retrieved by the algorithm engine 242 for the purpose of generating scoring equations.

Figure 4:
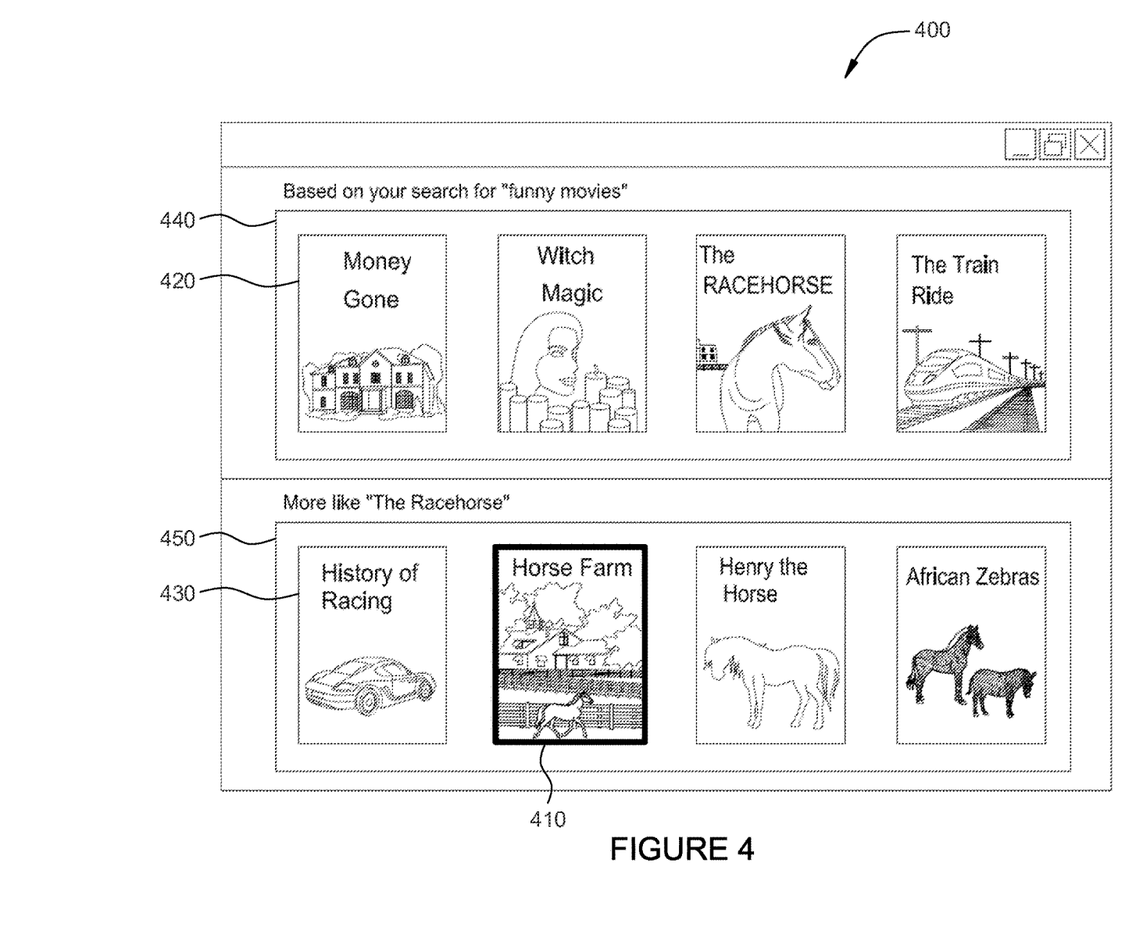
FIG. 4 illustrates a screen shot of recommendations presented on the client device of FIG. 3, according to one embodiment of the present invention.

FIG. 4 illustrates a screen shot 400 of recommendations presented on the client device 305 of FIG. 3, according to one embodiment of the present invention. As shown, the screen shot 400 includes representations of recommended items including items 410, 420, and 430 and item groups 440 and 450.

As described herein, each recommendation set generated by the recommendation system 160 is presented via the client device 305 on a graphical user interface. The items, such as items 410, 420, and 430, may be grouped according to categories. As shown, item group 440 includes recommended items based on a search for media titles having the genre "funny movies." Item group 450 includes recommended items based media titles that are similar to the media title having the title "The Racehorse." Items may be grouped in any technically feasible fashion. One of the items in the recommendation set may be selected by a user of the client device 305. For purposes of this discussion, item 410 is shown as having been selected based on the heavier border around the icon for item 410. Any technically feasible approach may be used to indicate a selected item. Other items in the recommendation set, such as items 420 and 430, have not been selected. In one embodiment, when an item has been selected or a new recommendation set is requested, the client device 305 may transmit data regarding the selected item 410 and non-selected items, such as items 420 and 430, to the recommendation system 160. In another embodiment, if an item has been selected, then the client device 305 may transmit data regarding only the selected item 410. In this embodiment, the recommendation system 160 may derive data regarding the non-selected items, such as items 420 and 430, based on items in the recommendation other than the selected item 410. In another embodiment, if no item has been selected, and a new recommendation set is requested, then the recommendation system 160 may derive data regarding the non-selected items, based on all items in the recommendation, since no item in the recommendation set was selected.

Alternatively, the logging engine 246 derives data regarding non-selected media titles based those media titles that have been presented to the user, but that that the user did not select The recommendation system 160 selects recommendations for consequent recommendation sets based on data associated with the selected item 410 and non-selected items, such as items 420 and 430. The recommendation system 160 selects recommendations for consequent recommendation sets further based on data associated with the authenticated negative examples 245. As a result, items represented by the authenticated negative examples 245 are less likely to appear in recommendation sets, such as the recommendation set represented by screen shot 400.

Figure 5:
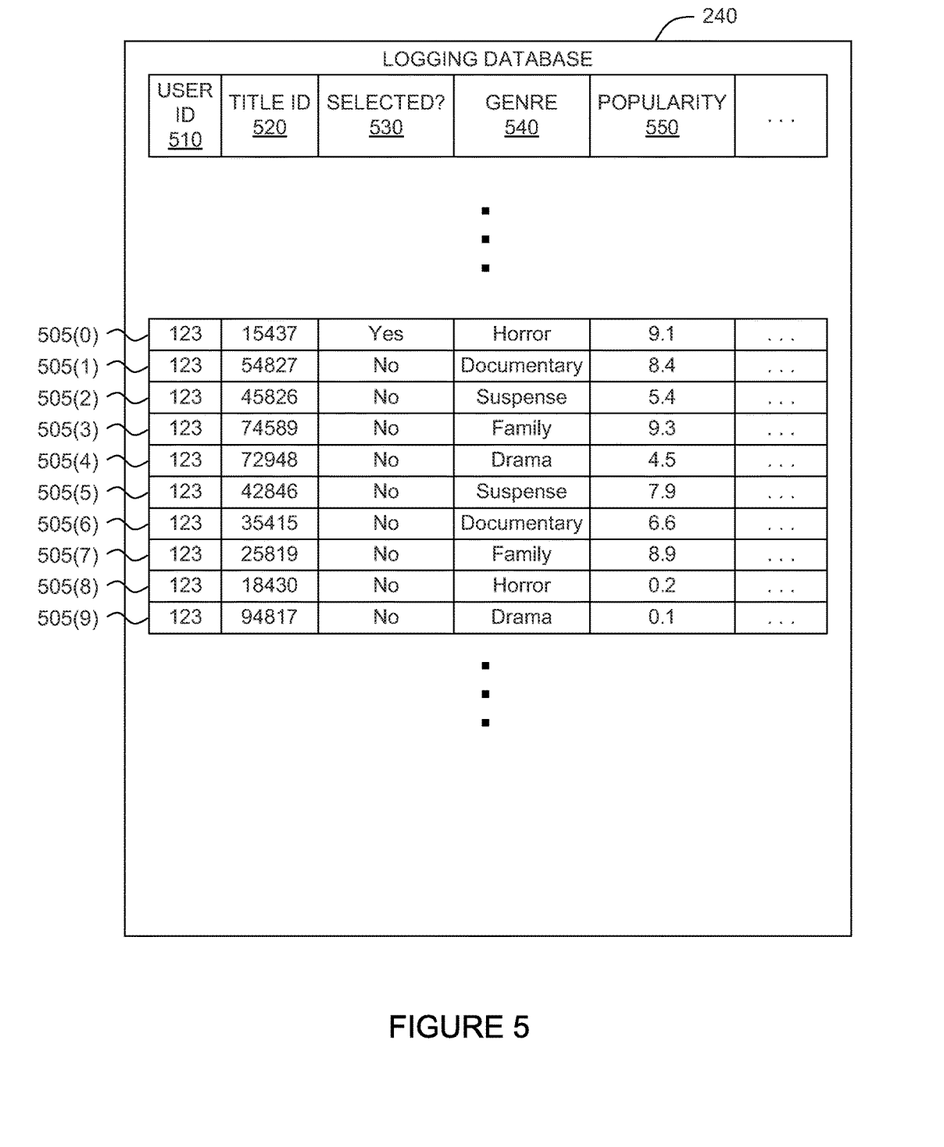
FIG. 5 illustrates a portion of the logging database of FIG. 3, according to one embodiment of the present invention.

FIG. 5 illustrates a portion of the logging database 240 of FIG. 3, according to one embodiment of the present invention. As shown, the portion of the logging database 240 includes ten exemplary data entries 505(0)-505(9).

Each data entry includes fields such as a user identifier (user ID) field 510, a media title identifier (title ID) field, a selected field 530, a genre field 540, and a popularity field 550. The data entries 505(0)-505(9) may also include any number of other data fields, not explicitly shown, including, without limitation, a rating, a director, a lead actor, and a release date. In some embodiments, the data entries 505(0)-505(9) may not include all of the data fields illustrated in FIG. 5.

The user identifier field 510 is a unique identifier that corresponds to a particular user or login account. The user identifier field 510 may be expressed via any technically feasible manner, including, without limitation, a numeric value, an alphanumeric user name, and an account number. The media title identifier 520 field is an alphanumeric identifier, such as a numeric value or a text string that uniquely identifies a particular media title. The selected field 530 is a binary value or text string that identifies whether the corresponding data entry was selected or not selected by the user corresponding to the user identifier field 510. The selected field 530 for data entries corresponding to media titles selected from the authenticated negative examples 245 is set to indicate a non-selected media title. The genre field 540 is a numeric value or text string that identifies the genre of the corresponding media title, including, without limitation, horror, drama, family, Snse, and documentary. The popularity field 550 indicates the relatively popularity of the media title versus other media titles. In one example, the popularity field 550 could include a numeric value between 1.0 and 10.0 inclusively.

The exemplary data entries 505(0)-505(9) correspond to a user having a user identifier of "123." Data entry 505(0) corresponds to an item selected by user 123, as indicated by the selected field 530. Data entry 505(0) indicates that user 123 selected media title 15437, a horror movie with a popularity of 9.1. Data entries 505(1)-505(7) correspond to items not selected by user 123, as indicated by the selected field 530. Data entries 505(8)-505(9) correspond to items generated from the authenticated negative examples 245.

One should note that, other than a very low value in the popularity field 550, data entries 505(8)-505(9) are indistinguishable from data entries 505(1)-505(7) in that all of these data entries appear as non-selected items. The difference is that data entries 505(8)-505(9) were generated by the sampling engine 248 from the authenticated negative examples 245; whereas, data entries 505(1)-505(7) result from items presented as recommended to user 123, but not selected by user 123. By contrast, data entries 505(8)-505(9) do not result from items presented to, and not selected by, user 123. By generating data entries 505(8)-505(9), the recommendation system 160 maintains a record, via the logging database 240, that the corresponding media titles are less desirable, even though the media titles corresponding to data entries 505(8)-505(9) were not presented as an option to user 123. In other words, user 123 was not "subjected to" receiving, and seeing, recommendations for the undesirable media titles corresponding to data entries 505(8)-505(9). Nevertheless, the algorithm engine 242 generates scores based on all data entries in the logging database 240, including data entries 505(8)-505(9). As a result, media titles included in the authenticated negative examples 245 receive a low score by the algorithm engine 242 and the scoring engine 244 even if these media titles are not including in recommendation sets transmitted to the client device 305. By employing such an approach, the recommendation system 160 may generate more relevant recommendation sets to client devices without sending undesirable titles as recommendations.

It will be appreciated that the system shown herein is illustrative and that variations and modifications are possible. In one example, particular embodiments are described using recommendation sets associated with streaming of media content. However, the techniques described herein could be deployed for generating recommendation sets for any technically feasible collection of goods and services.

Figure 6:
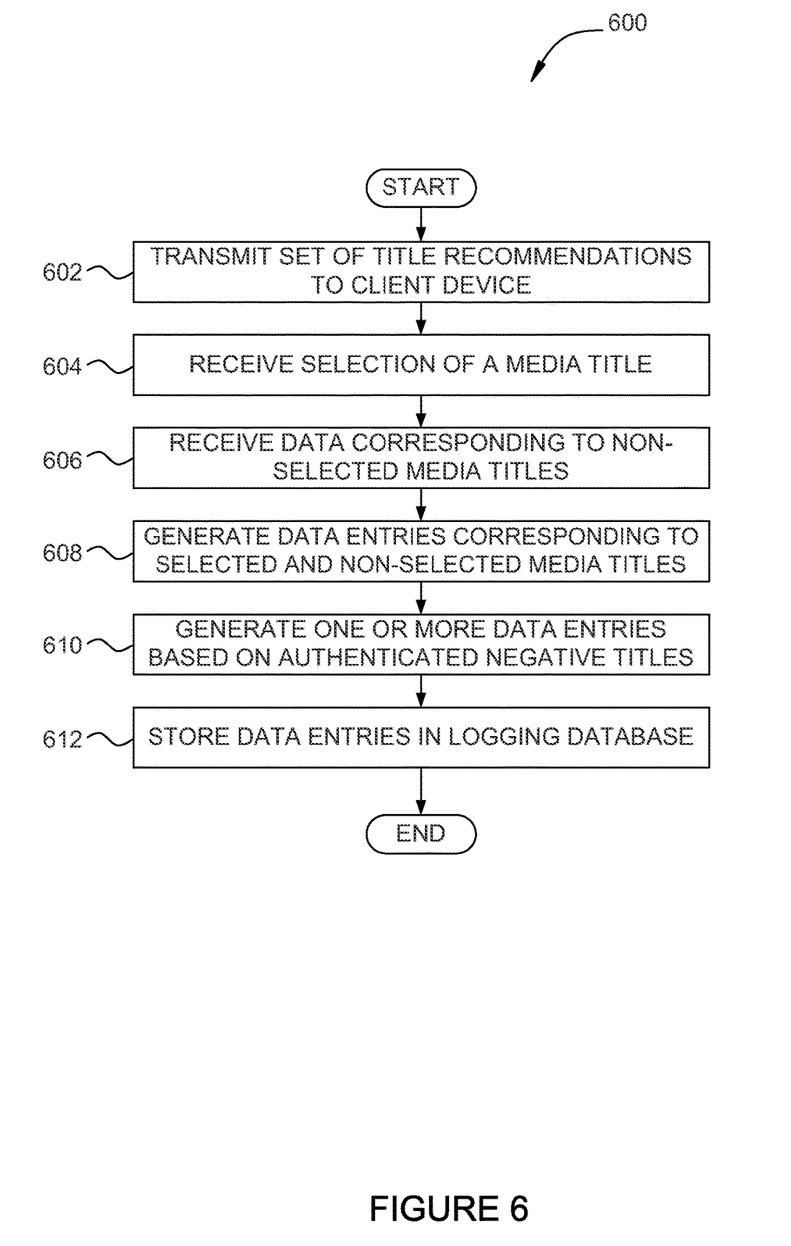
FIG. 6 sets forth a flow diagram of method steps for updating a logging database associated with a recommendation system, according to one embodiment of the present invention.

FIG. 6 sets forth a flow diagram of method steps for updating a logging database 240 associated with a recommendation system 160, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, a method 600 begins at step 602, where the recommendation system 160 transmits a recommendation set that includes media title recommendations to a client device. At step 604, the recommendation system 160 receives data corresponding to a selection of a media title from the client device. At step 606, the recommendation system 160 receives data corresponding to one or more non-selected media titles from the client device. At step 608, the recommendation system 160 generates data entries corresponding to at least a portion of the selected and non-selected media titles. At step 610, the recommendation system 160 generates one or more data entries based on selected media titles from the authenticated negative examples 245. At step 612, the recommendation system 160 stores the data entries corresponding to the selected and non-selected media titles and the authenticated negative examples 245 in the logging database 240. The method 600 then terminates.

Figure 7:
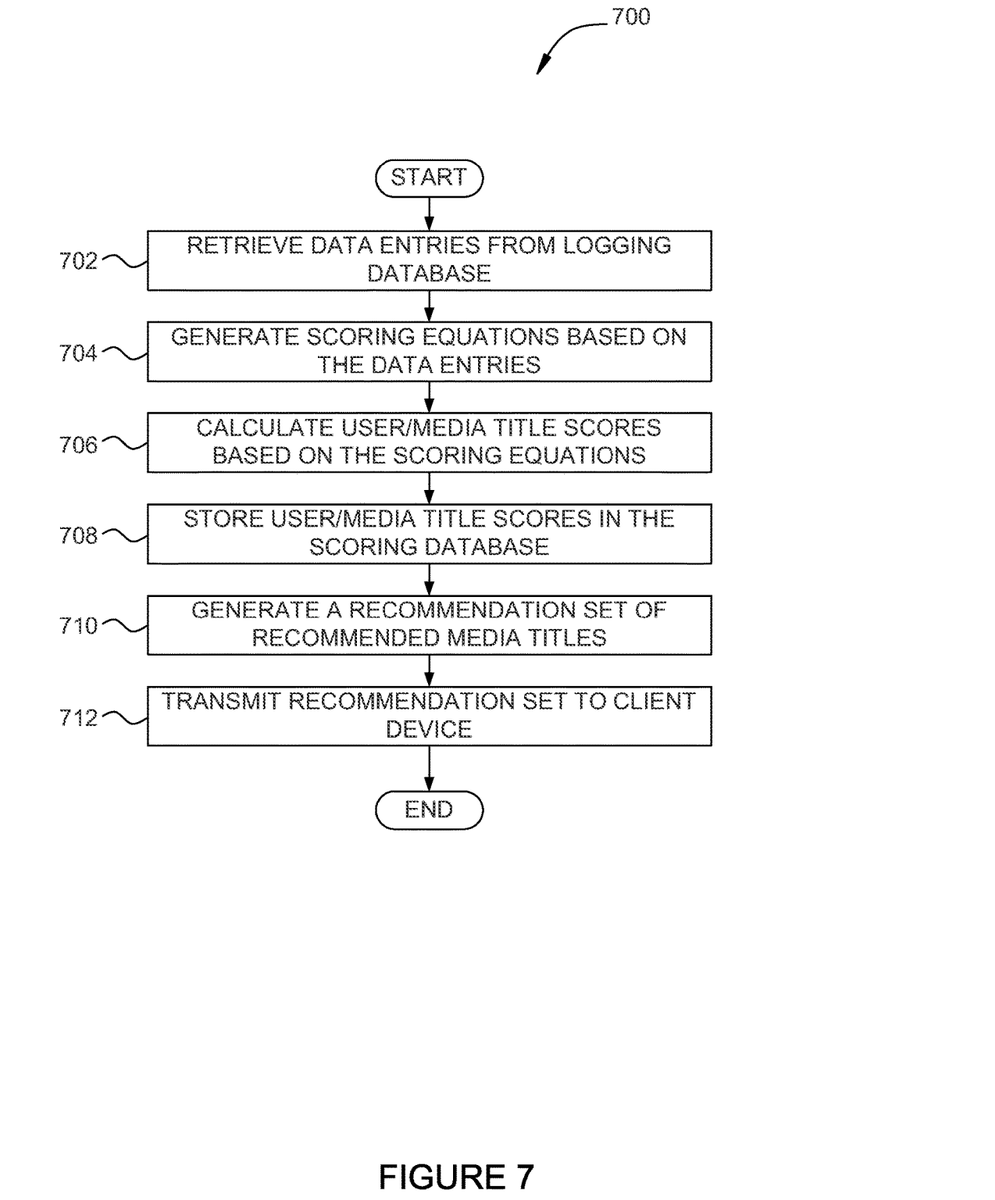
FIG. 7 sets forth a flow diagram of method steps for generating recommendation sets for a client device, according to one embodiment of the present invention.

FIG. 7 sets forth a flow diagram of method steps for generating recommendation sets for a client device, according to one embodiment of the present invention. Although the method steps are described in conjunction with the systems of FIGS. 1-5, persons of ordinary skill in the art will understand that any system configured to perform the method steps, in any order, is within the scope of the present invention.

As shown, a method 700 begins at step 702, where the recommendation system 160 retrieves data entries from the logging database 240. The retrieved data entries include data entries associated with selected items, data entries associated with non-selected items, and additional generated data entries based on authenticated negative examples 245. At step 704, the recommendation system 160 generates scoring equations based on the data entries retrieved from the logging database 240. At step 706, the recommendation system 160 calculates scores for user/media title combinations based on the scoring equations. In general, scores are increased for media titles associated with selected items, decreased for media titles associated with non-selected items, and decreased for media titles associated with authenticated negative examples 245. At step 708, the recommendation system 160 stores the calculated scores in a scoring database 235. At step 710, the recommendation system 160 generates a recommendation set of recommended media titles corresponding to a given client device based, at least in part, on the scores stored in the scoring database 235. Because the scores are based in part on authenticated negative examples 245, the resulting recommendation set represents a more accurate and more relevant set of media titles. At step 712, the recommendation system 160 transmits the recommendation set to the client device. The method 700 then terminates.

In sum, a recommendation system collects data in the form of messages from a large quantity of client devices, wherein the data include information regarding media titles selected for playback by users associated with the client devices as well as media titles presented to the users but, nevertheless, not selected for playback by the users. The recommendation system generates additional messages, where each of the generated message appears to be related to a media titles not selected for playback by a user, but instead is a message corresponding to a media title selected from a set of authenticated negative titles or examples. The recommendation system selects at least a portion of the received selection messages, the received non-selection messages, and the generated messages to store in a log file. The recommendation system periodically calculates scores for each user/media title pairing based on the entries in the log file. The recommendation system then generates additional recommendations to transmit to the client devices based on the calculated scores.

One advantage of the disclosed techniques is that the use of authenticated negative examples provides a more relevant set of recommendations for the user. As a result, the user enjoys a richer and more meaningful user experience. By using authenticated negative examples to influence recommendations, better, more accurate, more meaningful recommendation sets are advantageously generated for users.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method, comprising:
   receiving, from a first client device, a first selection of a first recommended item included in a plurality of recommended items presented on the first client device for streaming to the first client device over a network, wherein each of the plurality of recommended items is tagged with a user identifier associated with a user of the first client device;
   identifying a second recommended item included in the plurality of recommended items that has not been selected for presentation by the user of the first client device, wherein the second recommended item is marked as an item that has not been selected for presentation by the user of the first client device;
   retrieving an authenticated negative item from a plurality of authenticated negative items not included in the plurality of recommended items, wherein the plurality of authenticated negative items are not presented on the first client device and are associated with content deemed to be undesirable by one or more users other than the user of the first client device;
   tagging the authenticated negative item with the user identifier associated with the user of the first client device;
   marking the authenticated negative item as an item that has not been selected by the user of the first client device;
   storing in a digital log file one or more entries associated with a presentation of the plurality of recommended items on the first client device, wherein each of the one or more entries includes the user identifier associated with the user of the first client device, and wherein at least one of the one or more entries identifies the authenticated negative item tagged with the user identifier and marked as an item that has not been selected; and
   generating a second plurality of recommended items for presentation on the first client device based at least on the one or more entries stored in the digital log file.

2. The method of claim 1, further comprising identifying all remaining recommended items included in the plurality of recommended items that have not been selected.

3. The method of claim 2, further comprising, for each of the remaining recommended items, storing an entry in the digital log file based on the recommended item.

4. The method of claim 1, wherein each entry in the one or more entries plurality of entries includes an item identifier and at least one rating parameter.

5. The method of claim 4, wherein the at least one rating parameter includes a popularity value.

6. The method of claim 4, wherein the at least one rating parameter includes a genre.

7. A non-transitory computer-readable storage medium including instructions that, when executed by a processing unit, cause the processing unit to perform an operation, the operation comprising:
   receiving, from a first client device, a first selection of a first recommended item included in a plurality of recommended items presented on the first client device for streaming to the first client device over a network, wherein each of the plurality of recommended items is tagged with a user identifier associated with a user of the first client device;
   identifying a second recommended item included in the plurality of recommended items that has not been selected for presentation by the user of the first client device, wherein the second recommended item is marked as an item that has not been selected for presentation by the user of the first client device;

retrieving an authenticated negative item from a plurality of authenticated negative items not included in the plurality of recommended items, wherein the plurality of authenticated negative items are not presented on the first client device and are associated with content deemed to be undesirable by one or more users other than the user of the first client device;

tagging the authenticated negative item with the user identifier associated with the user of the first client device;

marking the authenticated negative item as an item that has not been selected by the user of the first client device;

storing in a digital log file one or more entries associated with a presentation of the plurality of recommended items on the first client device, wherein each of the one or more entries includes the user identifier associated with the user of the first client device, and wherein at least one of the one or more entries identifies the authenticated negative item tagged with the user identifier and marked as an item that has not been selected; and generating a second plurality of recommended items for presentation on the first client device based at least on the one or more entries stored in the digital log file.

8. The non-transitory computer-readable storage medium of claim 7, wherein the operation further comprises, identifying all remaining recommended items included in the plurality of recommended items that have not been selected.

9. The non-transitory computer-readable storage medium of claim 8, wherein the operation further comprises, for each of the remaining recommended items, storing an entry in the digital log file based on the recommended item.

10. The non-transitory computer-readable storage medium of claim 7, wherein at least one of the first recommended item, the second recommended item, and the authenticated negative item is related to a good or service that is available for purchase.

11. The non-transitory computer-readable storage medium of claim 7, wherein at least one of the first recommended item, the second recommended item, and the authenticated negative item is related to a media title that is available for streaming to the first client device.

12. The non-transitory computer-readable storage medium of claim 7, wherein each entry in the plurality of entries includes a user identifier, an item identifier, and at least one rating parameter.

13. The non-transitory computer-readable storage medium of claim 12, wherein the at least one rating parameter includes a popularity value.

14. A computing device, comprising:
a memory; and
a processor that executes instructions stored in the memory to:
receive, from a first client device, a first selection of a first recommended item included in a plurality of recommended items presented on the first client device for streaming to the first client device over a network, wherein each of the plurality of recommended items is tagged with a user identifier associated with a user of the first client device, and identify a second recommended item included in the plurality of recommended items that has not been selected for presentation by the user of the first client device, wherein the second recommended item is marked as an item that has not been selected for presentation by the user of the first client device, retrieve an authenticated negative item from a plurality of authenticated negative items not included in the plurality of recommended items, wherein the plurality of authenticated negative items are not presented on the first client device and are associated with content deemed to be undesirable by one or more users other than the user of the first client device, tag the authenticated negative item with the user identifier associated with the user of the first client device, mark the authenticated negative item as an item that has not been selected by the user of the first client device, store in a digital log file one or more entries associated with a presentation of the plurality of recommended items on the first client device, wherein each of the one or more entries includes the user identifier associated with the user of the first client device, and wherein at least one of the one or more entries identifies the authenticated negative item tagged with the user identifier and marked as an item that has not been selected, and generate a second plurality of recommended items for presentation on the first client device based at least on the one or more entries stored in the digital log file.

* * * * *